United States Patent
Liu

(10) Patent No.: US 6,954,875 B2
(45) Date of Patent: Oct. 11, 2005

(54) METHOD OF RECOVERING A FLIGHT CRITICAL COMPUTER AFTER A RADIATION EVENT

(75) Inventor: Chung-Yu Liu, Wayne, NJ (US)

(73) Assignee: Honeywell International Inc., Morristown, NJ (US)

(*) Notice: Subject to any disclaimer, the term of this patent is extended or adjusted under 35 U.S.C. 154(b) by 457 days.

(21) Appl. No.: 10/095,730

(22) Filed: Mar. 12, 2002

(65) Prior Publication Data

US 2003/0033553 A1 Feb. 13, 2003

Related U.S. Application Data

(60) Provisional application No. 60/275,544, filed on Mar. 12, 2001.

(51) Int. Cl.[7] ............................................. G06F 11/00
(52) U.S. Cl. ................................. 714/6; 714/5; 714/42
(58) Field of Search ........................... 714/5, 6, 42, 15; 717/170, 173

(56) References Cited

U.S. PATENT DOCUMENTS

| 5,134,619 | A | | 7/1992 | Henson et al. |
| 5,363,502 | A | | 11/1994 | Kagimasa et al. |
| 5,649,089 | A | | 7/1997 | Kilner |
| 5,812,565 | A | | 9/1998 | Fendt et al. |
| 5,835,695 | A | * | 11/1998 | Noll ............................... 714/6 |
| 5,938,774 | A | | 8/1999 | Hsu |
| 6,154,854 | A | | 11/2000 | Stallmo |
| 6,195,695 | B1 | * | 2/2001 | Cheston et al. ............. 709/221 |
| 6,430,663 | B1 | * | 8/2002 | Ding .......................... 711/162 |
| 6,615,375 | B1 | * | 9/2003 | Mounes-Toussi et al. ..... 714/54 |
| 6,665,813 | B1 | * | 12/2003 | Forsman et al. .............. 714/15 |
| 2001/0016919 | A1 | | 8/2001 | Tanaka et al. |
| 2002/0032881 | A1 | | 3/2002 | Ng et al. |
| 2003/0126493 | A1 | * | 7/2003 | Lee ............................... 714/6 |

OTHER PUBLICATIONS

International Search Report PCT/US02/07666; mailed Jun. 5, 2002.

* cited by examiner

*Primary Examiner*—Robert Beausoliel
*Assistant Examiner*—Yolanda L Wilson
(74) *Attorney, Agent, or Firm*—Kurt Luther; James W. Falk

(57) ABSTRACT

A method and apparatus for recovering a real-time computer system by running multiple versions of an operational program including multiple data partitions are described wherein each of the multiple data partitions is associated with one version of the operational program and wherein one of the versions of the operational program is a 'controller' program and the other versions are 'identity observer' programs.

7 Claims, 12 Drawing Sheets

MEMORY RECOVERY FLAG IN MEMORY PARTITION 1
(1:DO RECOVERY, 2: NO RECOVERY)

MEMORY RECOVERY FLAG IN MEMORY PARTITION 2
(1:DO RECOVERY, 2: NO RECOVERY)

MEMORY RECOVERY FLAG IN MEMORY PARTITION 3
(1:DO RECOVERY, 2: NO RECOVERY)

ALTITUDE VS ALTITUDE REFERENCE

METHOD OF RECOVERING A FLIGHT CRITICAL COMPUTER AFTER A RADIATION EVENT

CROSS-REFERENCE TO RELATED APPLICATIONS

This application claims priority from U.S. Provisional Patent Application Ser. No. 60/275,544 entitled, "METHOD OF RECOVERING A REAL-TIME COMPUTER AFTER A TRANSIENT EVENT USING AN IDENTITY OBSERVER ARRAY", and filed on Mar. 12, 2001. The contents of U.S. Provisional Patent Application Ser. No. 60/275,544 are fully incorporated herein by reference.

FEDERALLY SPONSORED RESEARCH OR DEVELOPMENT

Not Applicable

BACKGROUND OF THE INVENTION

1. Technical Field

This invention relates to real-time computing systems and more specifically to a method for recovering a real-time computer system after a transient radiation event such as that caused by a cosmic ray striking a trace within a semiconductor device.

2. Background Art

Several types of radiation are known to induce adverse effects within microelectronic devices. It is well known that the energetic particles in space radiation, including protons and heavy ions, can cause anomalies in electronic equipment, such as flight critical computers, onboard satellites, spacecraft and aerial vehicles flying at high altitudes. A single energetic particle can deposit sufficient charge in an integrated circuit to change the state of internal storage elements and may also cause more complex internal behavior. The observable changes of state can include bit-flips, latched power conditions, and short circuits. A bit-flip, such as from logic '0' to logic '1', is an example of a transient fault mode known as a single event upset (SEU). A latched power condition is an example of a potentially catastrophic fault mode known as a single event latch-up (SEL). A short circuit in an integrated circuit typically results in a hard failure, which is typically mitigated by redundant circuitry. In order to protect a spacecraft against a single flight critical computer failure, redundant computers are typically employed.

FIG. 1 shows a triple redundant flight critical computer architecture that might typically be used onboard a spacecraft. Redundant sensors 15 provide inputs to a first computer 11, a second computer 12, and a third computer 13. Each computer includes inputs 17, processing 18, and outputs 19. The outputs from each of the redundant computers 11–13 are routed to redundant sensors 16. In addition, the redundant computers 11–13 are interconnected with a cross-channel data link (CCDL) 14 which allows the computers to interchange data.

It is important that each flight critical computer, such as a spacecraft navigation computer, is able to detect and recover from both an SEU and an SEL because an undetected transient fault can possibly diverge to a hard failure. It is known in the art to recover a flight critical computer via re-initialization schemes, for example by cycling power (on-off-on). Although cycling power to the computer clears SEU or SEL induced errors, it also results in a period of time when the computer is not available for such tasks as spacecraft stabilization.

FIG. 2 depicts a block diagram of a typical flight critical computer that may be found onboard a spacecraft. The computer includes a central processing unit (CPU) 21 connected by an address bus 22 and a data bus 23 to a nonvolatile memory (NVM) 24, a memory-mapped input/output controller 25, and random access memory (RAM) hardware modules 26–28. The input/output controller 25 is connected to inputs 17 using, for example, analog to digital converters, and to outputs 19 using, for example, relay drivers. An operational flight program (OFP) is loaded during an initialization sequence to the random memory modules 26–28 and is then executed.

A known method of recovering a flight critical computer in a radiation environment, without accessing another computer via the CCDL 14 and re-initialing, is to save the state data of the computer, stored in random access memory (RAM) 26–28, to a radiation-hardened temporary storage while executing the operational flight program (OFP). When a single event upset (SEU) is detected, for example by a parity check, data is dumped from the temporary storage back to the random access memory (RAM) 26–28. However, this prior art approach fails to insure data integrity in the temporary storage and also can cause the redundant computers 11–13 to lose synchronization. In addition, the recovered computer needs to be re-admitted before the next SEU occurs and there can be critical phases of a mission during which re-initialization is not practical, such as initializing a de-orbit burn.

Recently, much effort has been devoted to the research and design of fault-tolerant control systems. The primary interest of this research is the application of fault detection, identification and reconfiguration (FDIR) to control systems. The common objective of FDIR in flight control systems is to prevent the loss of a vehicle due to faulty sensors, faulty actuators, and damaged control surface installations. A typical FDIR design aims to prevent the flight critical computer 11 from using erroneous data from faulty sensors 15 and from sending out improper control to faulty actuators 16. A typical flight critical computer includes both a fault detection and identification algorithm and a fault accommodation/reconfiguration algorithm. The fault detection and identification algorithm, typically embedded in the control laws, is devised to detect faulty components in the various control loops. The reconfiguration algorithm is typically a vehicle-specific adaptive mechanism that cancels the adverse effects caused by faulty components, such as 'hard-over' actuators.

There is a long felt need for an autonomous rapid recovery mechanism for a flight-critical computer from a radiation event. Such a mechanism should augment the physical redundancy and fault detection, identification and reconfiguration (FDIR) already available in the art.

SUMMARY OF THE INVENTION

The function of real-time self-recovery is not currently used in flight-critical computer systems. One of the concerns is that the SEU rate of a device is difficult to predict accurately. In addition, autonomous recovery is a cause for concern because an unsupervised or uncommanded computer recovery means that it is possible for a flight-critical computer to perform a system reset due to false alarm.

The present invention, for the real-time self-recovery of a flight critical computer, is based on the concept of analytical redundancy such that it can be realized in application software, without the need for additional radiation-hardened devices or other proprietary circuitry to increase the survivability of each flight critical computer. Advantageously, the present inventive method does not require extensive modifications to presently available real-time operating system (RTOS) software or operational flight programs (OFP) that may be available in the prior art, but utilizes faster central processing units (CPU) and hardware memory modules with greater storage capacity.

Analytical redundancy uses the functional relationship between system variables, which are processed in the operational flight program (OFP), to generate synthetic outputs that are comparable to the outputs from physical redundancy. These synthetic outputs are created by sequentially running multiple versions of the same or similar operational flight programs (OFP) on the central processing unit (CPU) 21 in each flight critical computer 11–13 and comparing the results. Thus, in accordance with an aspect of my invention, multiple versions of the same or similar computer programs are run on the same processor within the time frame required to previously run a single copy. One aspect of my invention is that each one of these multiple OFPs is associated with a dedicated memory partition located in a distinct hardware random access memory (RAM) module.

For example, the typical flight critical computer illustrated in FIG. 2 could have three versions of the OFP, where each version is located in RAM modules 26, 27, and 28 respectively. According to my invention, the effects of a single event upset (SEU), such as that caused by a cosmic ray event, will manifest itself in a data value contained in one memory partition.

One of the operational flight programs (OFP) is designated as the 'controller' OFP and the other OFPs are designated as 'observer' OFPs. The controller OFP is responsible for control of devices attached to the flight critical computer. The observer OFP can be a copy of the controller OFP or it can be an alternate design that replicates the full states of the controller.

Each OFP includes a fault detection and isolation algorithm in which the data results from that OFP are compared with the data results of the other OFPs. When the controller OFP is declared invalid, one of the observers is designated as the controller. It is another aspect of my invention that each invalid OFP is recovered by copying a data image of the memory partition associated with a valid OFP. The controller OFP becomes an observer OFP after data set recovery.

BRIEF DESCRIPTION OF DRAWINGS
Brief Description of the Several Views of the Drawing A full understanding of my invention can be ascertained by review of the drawing in which.

DETAILED DESCRIPTION OF THE INVENTION

Mode(s) for Carrying Out the Invention

The identity observers replicate the state data of the operational flight program of the controller in distinct data partitions in the memory modules. In accordance with an aspect of my invention, a faulty controller can be recovered by replacing the data image of the faulty data partition with that of a healthy data partition. A methodology of applying such an approach from the fault tolerant control perspective is described below.

Figure 1:
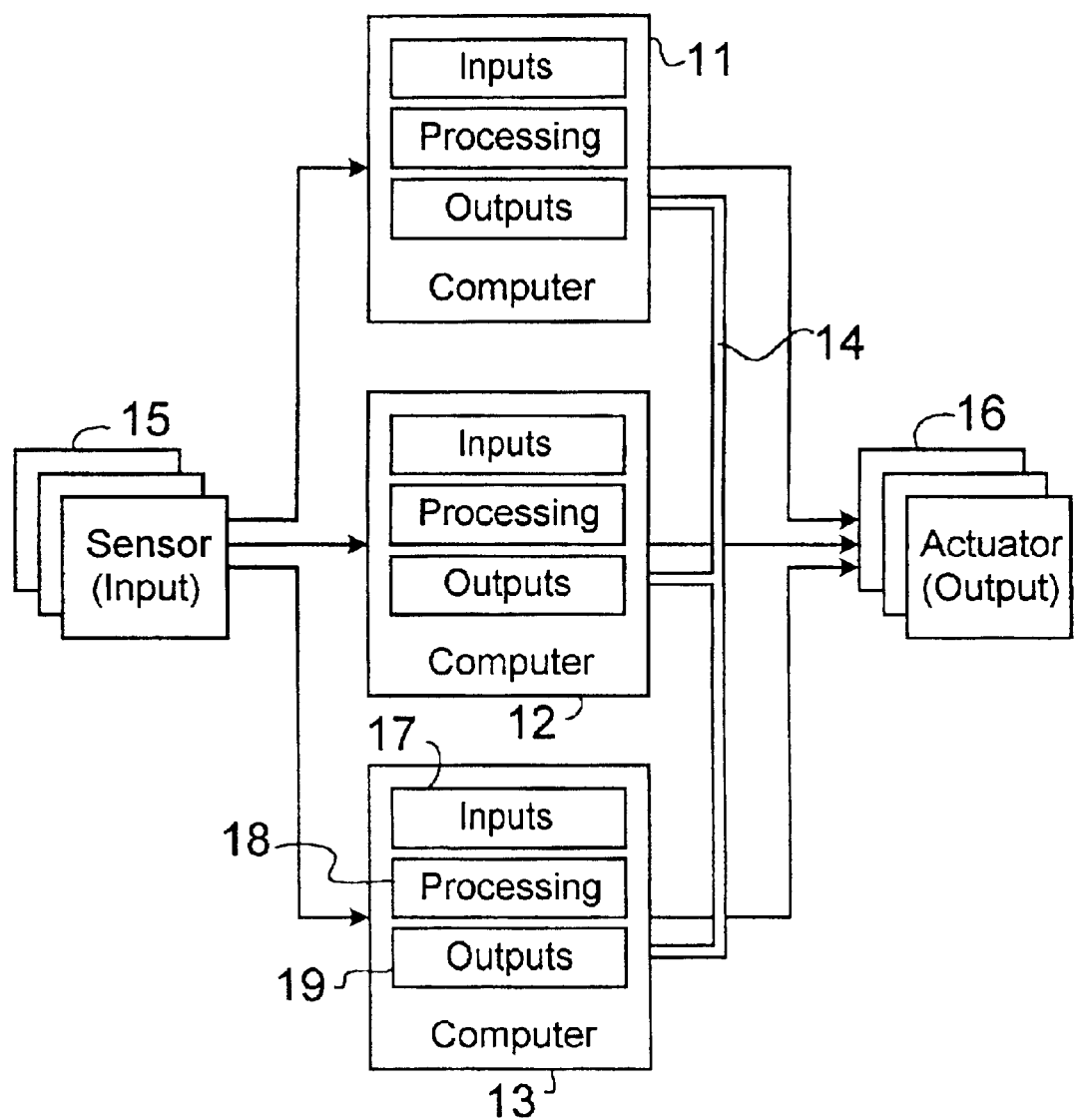
FIG. 1 depicts a set of triple redundant flight critical computers as may be found in the prior art.

Referring again to FIG. 1, there is depicted the functional components of a generic vehicle management system (VMS), in which my invention may be employed and comprising lanes of redundant vehicle management computers (VMC) 11–13, redundant input sensors 15, and redundant output actuators 16. Identical hardware and software are used in all lanes of the system for redundancy. The VMC can be, for example, a flight-critical computer executing flight mode logic and control laws and managing input and output signals. In general, a VMC might perform some of or all of the following tasks:

Navigation and Guidance
Flight Control
Thrust Control
Fire Control
Weapon Storage Management
Mission Management The redundant flight critical computers 11–13 are managed by a redundancy management system (RMS). The RMS is the fault tolerant mechanism that detects and accommodates the possible faults in the input and the output signals. In one embodiment, the RMS uses majority voting for fault detection. The redundant computers communicate with each other using a dedicated cross-channel data link (CCDL) 14, in which the RMS distributes selected data from each lane for voting. In general, a redundancy management system (RMS) might perform some of or all of the following tasks:

Fault Detection and Isolation
Fault Accommodation
Reconfiguration of Redundant Components
Recovery of Faulty Components
Lane Re-admittance Given the fact that the identity observer has the characteristic of an analytical redundancy to the original system, an identity observer can be designed to restore the state vector of the original system. Considering the VMS functions as the original system, and the term 'controller' herein denotes the VMS functions in general, an identity observer can be constructed to track the state data of the controller.

The identity observer is connected to the controller in series, meaning that computation of the controller and that of the observer can be executed sequentially. This enables us to expand our concept of a single observer to series observers. An array of identity observers can be designed accordingly. This enables data recovery in both the controller and the series observers.

Referring again to FIG. 2, each partitioned random access memory (RAM) hardware module 26–28 is operated by a dedicated data memory-partition manager. Similarly, the program code residing in the program memory is operated by a dedicated program partition manager. A hardware timer connected to the input signal management (ISM) block is devised to schedule the execution of run-time operational flight program (OFP). Another hardware timer is connected to fault detection, identification, and recovery (FDIR) block to regulate the activation of the FDIR procedure.

Figure 3:
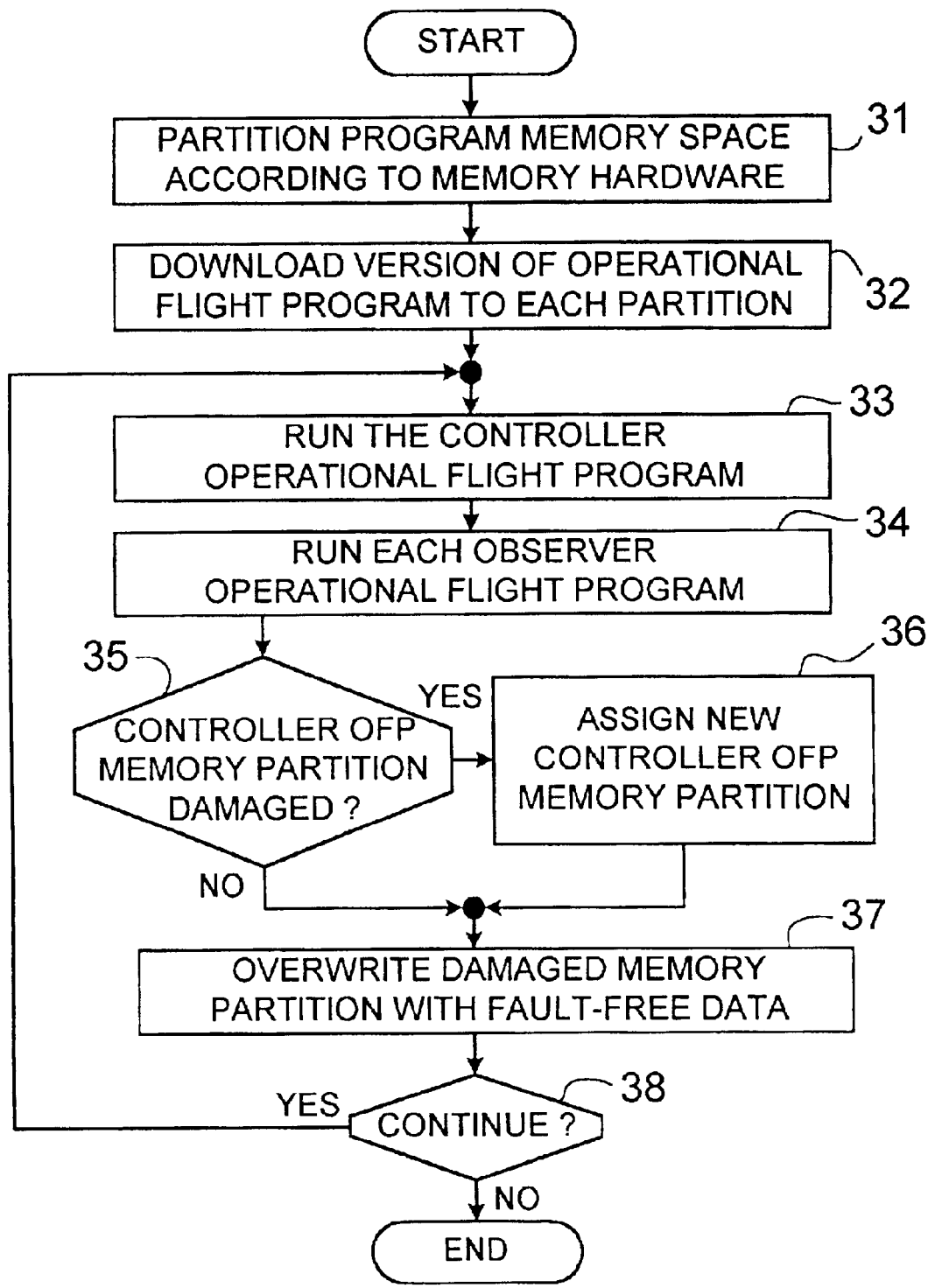
FIG. 3 is a flow chart illustrating a procedure for recovering a flight critical computer in accordance with an illustrative embodiment of the present invention.
Figure 7:
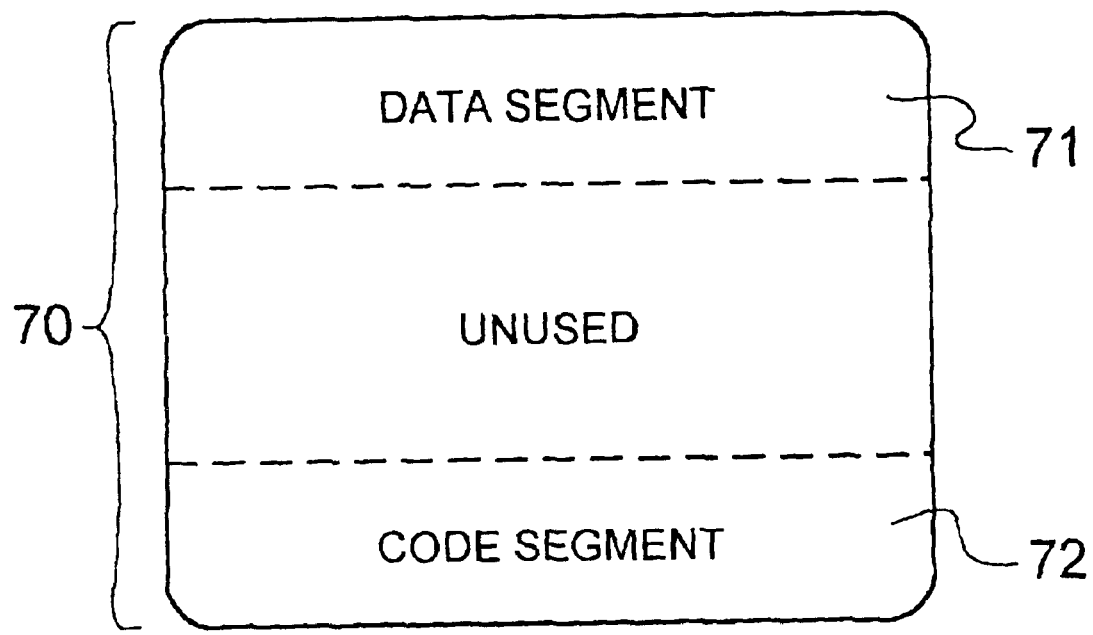
FIG. 7 depicts the layout of a memory partition contained on a distinct hardware module depicts an internal block diagram of a typical flight critical computer including memory-mapped inputs and outputs.

Refer now to FIG. 3, which shows the method steps of one illustrative embodiment of my invention and FIG. 7, which depicts a computer memory allocation scheme. First, the program memory space (software) is partitioned (step 31) according to the banks (hardware) of system RAM 26–28 to isolate blocks of memory and provide space redundancy, each memory partition corresponding to a hardware memory device in the flight computer. These hardware isolated memory blocks 70, including program memory data segments 71 and program memory code segments 73 as shown in FIG. 7, are allocated to accommodate the state data of the operational flight program (OFP). It is one aspect of my invention that a hardware isolated memory block is assigned to the controller operational flight program (OFP) and separate hardware isolated memory blocks are assigned to each of the observer operational flight programs (OFP). It is another aspect of my invention that the run-time portion of each OFP is encapsulated to access only RAM within its assigned partition.

A version of an executable operational flight program (OFP) is downloaded (step 32) from the flight critical computer nonvolatile memory (NVM) 24 to each of respective hardware isolated memory blocks 70, where each hardware isolated memory block is contained on a respective bank of system RAM 26–28. Each version of the OFP is an 'identity observer' of each other version, meaning that all state variables have corresponding values at the end of an iteration of the OFP.

The controller operational flight program (OFP) is run (step 33) and then each observer OFP is run in a predetermined sequence (step 34) to provide time redundancy. In a preferred embodiment of my invention, the sequenced execution of each OFP is scheduled by a dedicated hardware timer.

A fault detection and isolation (FDI) procedure on the outputs of the controller OFP is performed (step 35) to determine whether the controller OFP memory partition is damaged. If it is determined that the memory partition that is currently the 'controller' OFP is damaged, another memory partition is assigned (step 36) to be 'controller'.

Figure 4:
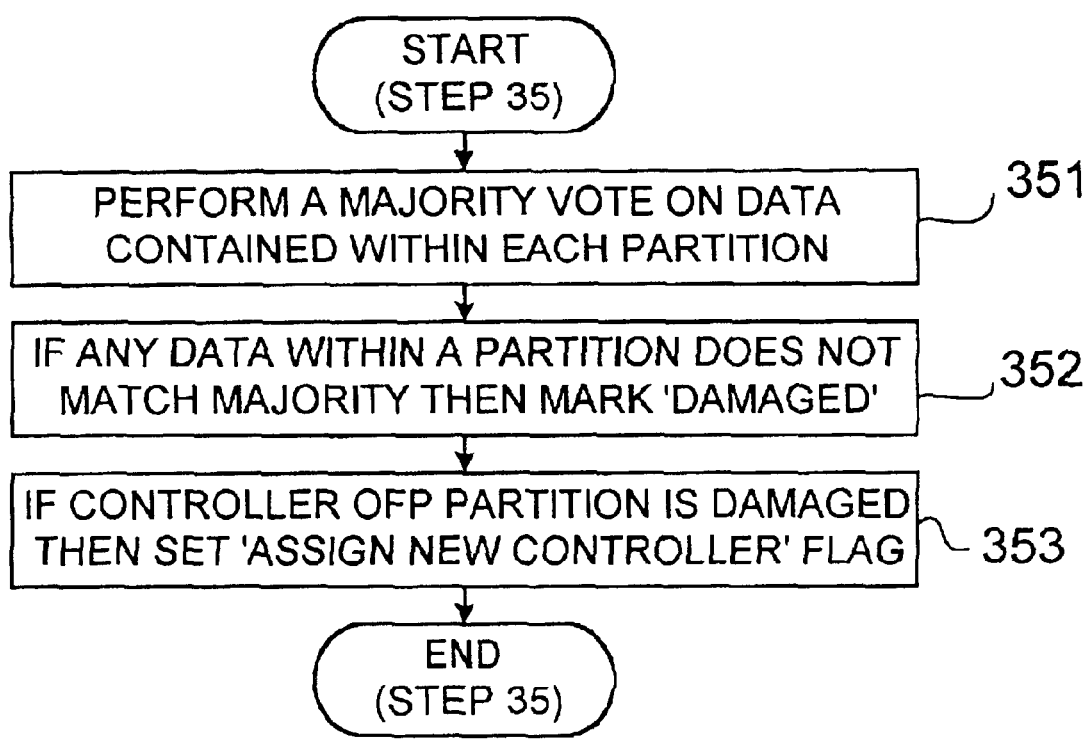
FIGS. 4, 5, and 6 illustrate specific details of the procedure of FIG. 3, in accordance with the present invention.

In one embodiment, as shown in FIG. 4, the data within the controller OFP memory partition is checked by performing (step 351) a majority vote of that data against corresponding data in the other 'observer' memory partitions. When any data in a partition does not match the majority results, it is marked (step 352) as damaged. When data within the controller OFP partition is damaged, then an 'assign new controller' can be set (step 353). In other embodiments, different fault detection and isolation schemes, such as parity checking or cross-channel comparison, are used instead of or in addition to majority voting.

Referring back to FIG. 3, when erroneous data is detected in one of the memory partitions, that data is overwritten (step 37) with fault-free data from an undamaged memory partition. Advantageously, this allows a flight-critical computer to recover from a single event upset (SEU) within a single iteration (time frame).

Figure 5:
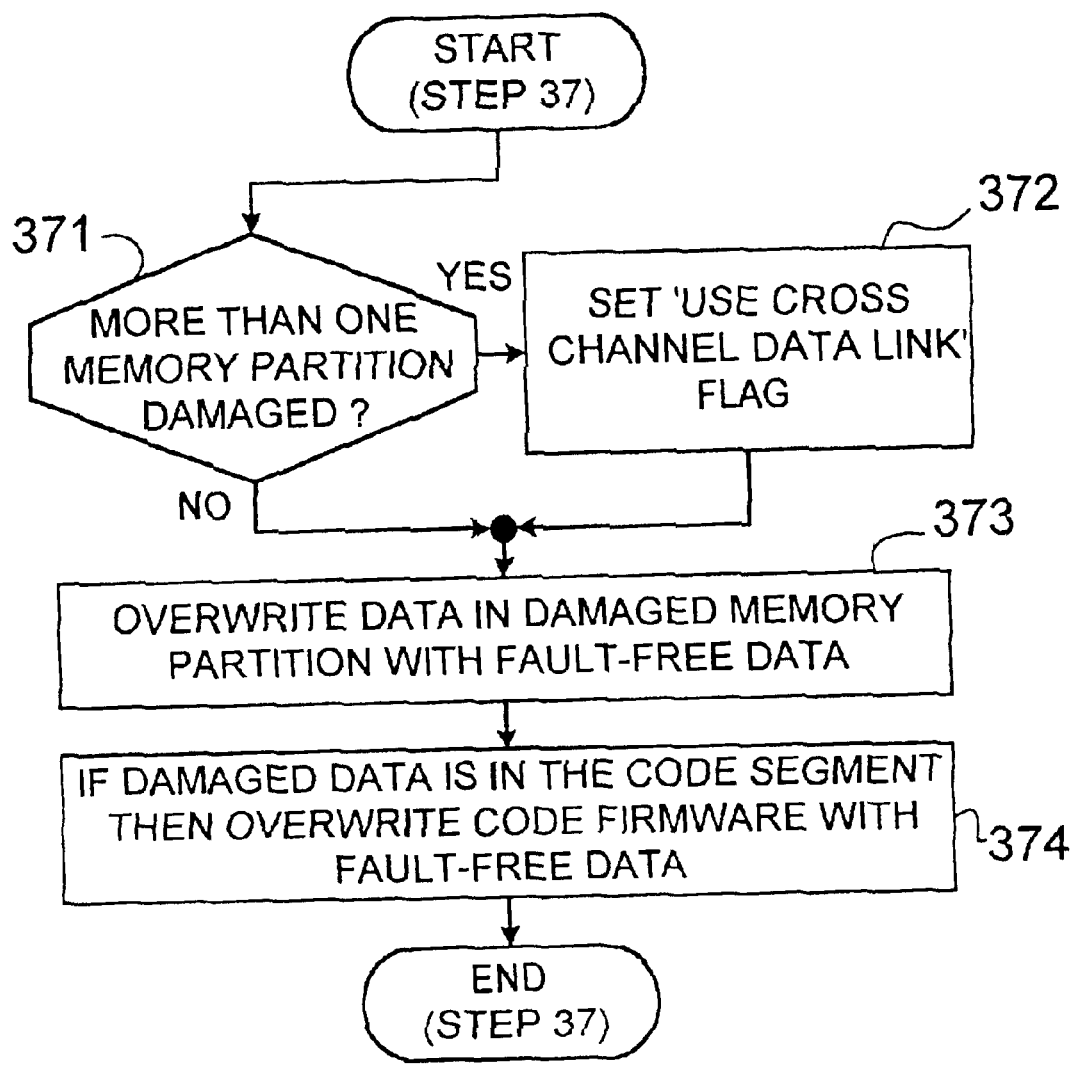

FIG. 5 details the sub-steps of the data overwriting method step (step 37). First, it is determined (step 371) whether more than one memory partition has been damaged, which would indicate that more than a single event upset (SEU) has occurred. If, for example, more than one memory partition has been damaged, a 'use cross channel data link' flag could be set (step 372) and the computer on which these memory partitions had been damaged could reset and rebuild its memory partitions via the cross channel data link 14 using methods that are known in the art.

When the damaged data occurs in a single memory partition, corresponding to a single event upset (SEU), that damaged data is overwritten (step 373) with fault-free data, as determined by the fault detection, identification and reconfiguration (FDIR) function discussed previously. In a preferred embodiment, if the damaged data is located in the code segment 72, as shown in FIG. 7, fault-free data is overwritten (step 374) over the code firmware, contained in nonvolatile memory (NVM) 24, thereby precluding a possible data error in the NVM.

Advantageously, the present invention recovers a flight critical computer from SEU-induced errors in the CPU, program memory data segment 71 and the program memory code segment 73. By duplicating the data image in the healthy memory partition, a faulty computer can be recovered in a minimal number of OFP iterations.

Figure 6:
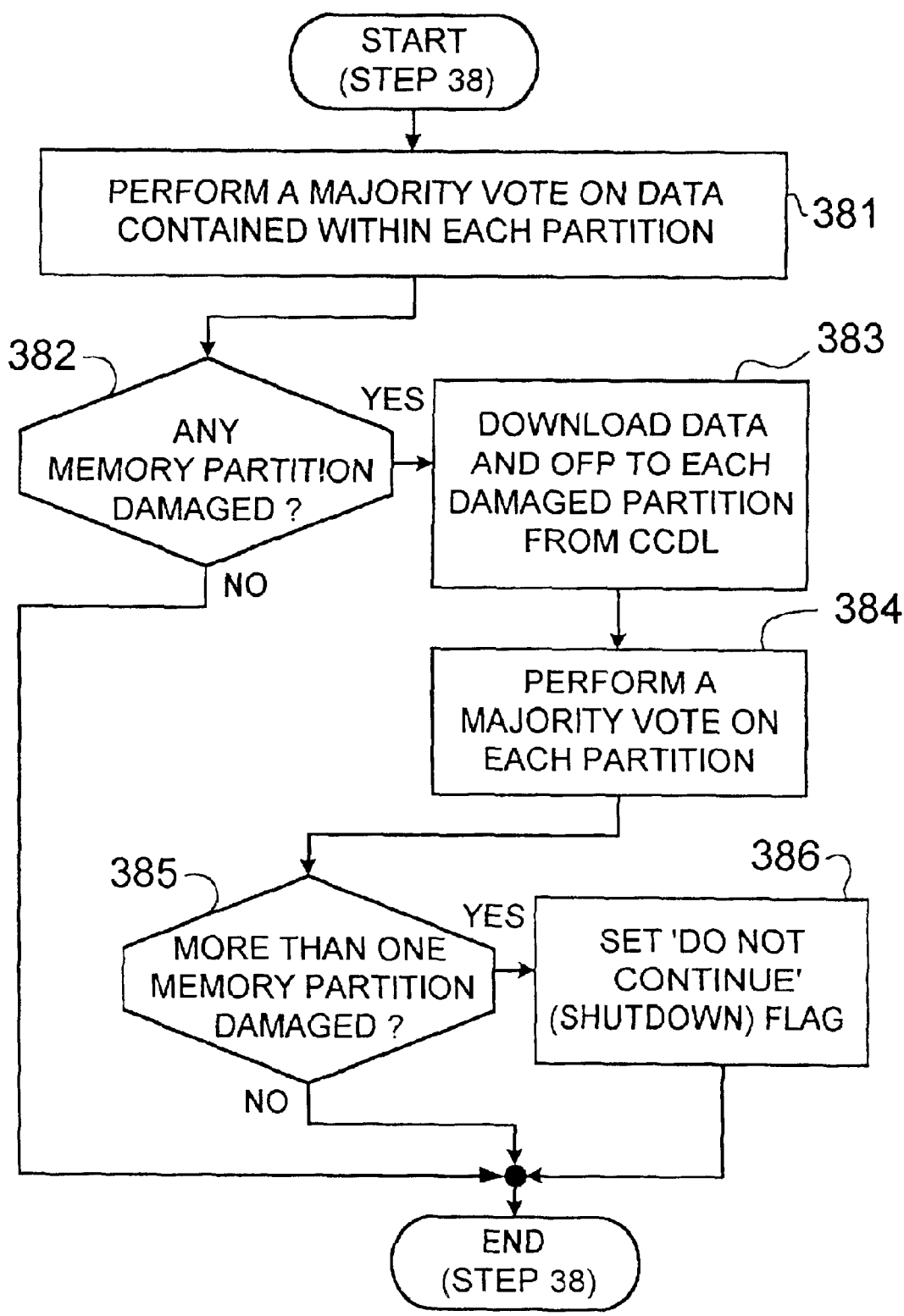

FIG. 6 details the sub-steps of determining whether to continue (step 38) operation of the flight computer after a damaged memory partition is damaged. First, a majority vote on data contained within each partition is performed (step 381) to reverify the memory partitions that are damaged. For each memory partition that is determined (step 382) to be damaged, the operational flight program and data are downloaded (step 383) to each damaged memory partition from the cross channel data link (CCDL) 14. Another majority vote is performed (step 385) on the data contained within each partition and it is determined whether more than one memory partition remains damaged (step 385). If more the one memory partition is damaged, then a 'do not continue' flag is set (step 386) which indicates that the flight computer should be taken off line.

Identity Observer

Figure 8:
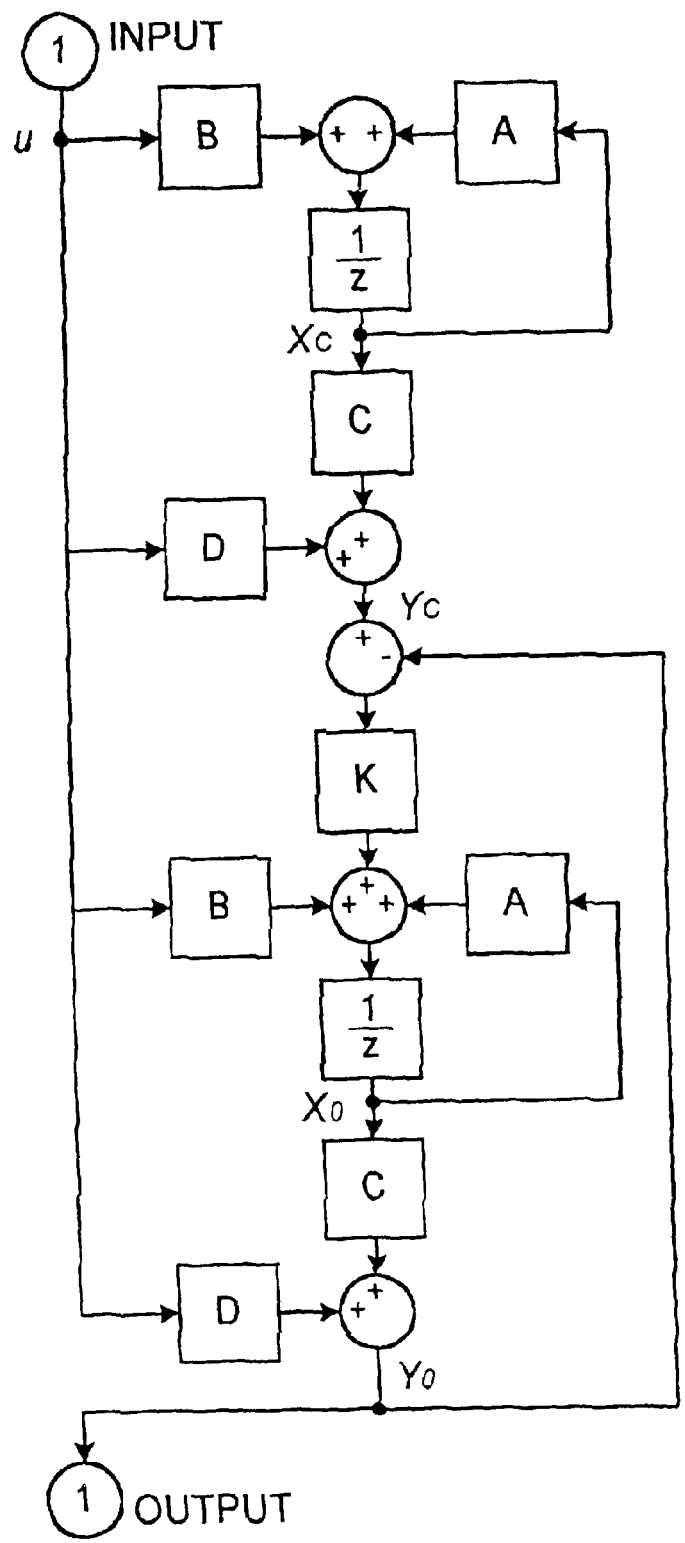
FIG. 8 depicts the block diagram of an identity observer constructed according to Luenberger's identity observer theorem that is suitable for use with my invention.

Referring now to FIG. 8, which depicts the block diagram of an identity observer, constructed according to Luenberger's identity observer theorem. Let a completely observable finite dimensional time invariant dynamical system be described by the following linear constant coefficient difference equations:

$$x_c(k+1) = Ax_c(k) + Bu(k)$$

$$y_c(k) = CX_c(k) + Du(k)$$

$$x_c(0) = [0; 0; \ldots; 0], y_c(0) = [0; 0; \ldots; 0] \qquad \text{Eq. 1}$$

where $x_c(k) \in R^n$ is the vector of system state, $x_c(0)$ and $y_c(0)$ are the vectors of initial condition of the system, $u(k) \in R^m$ is the vector of system input, and $y_c(k) \in R^p$ is the vector of system output. A, B, C, and D are appropriately dimensioned real constant matrices.

Perturbation of data in any components of the above equations results in anomalous in output y(t). In order to identify which component is altered in magnitude due to disturbance, an observer that is built on the mathematical description of the original system can be employed to track the state of the original system. Among the known observer designs, one that possesses a great degree of redundancy to the original system is the identity observer. The identity observer reconstructs all state variables of the original system.

A system suitable for use with my invention includes a controller OFP and an observer OFP. The system RAM is partitioned for each OFP. The size of the partition is equally allocated to enable the direct mapping of memory address. The program code of each OFP resides in the redundant program memory. The run-time OFP block, the FDIR block, the block of data recovery algorithm, and the block of program recovery algorithm are placed in a way of representing the real-time program execution. The architecture includes other necessary function blocks such as input signal management (ISM) and output signal management (OSM).

The Luenberger identity observer, shown in FIG. 8, is constructed in accordance with the following linear constant coefficient difference equations:

$$x_c(k+1)=Ax_c(k)+Bu(k)$$

$$y_c(k)=Cx_c(k)+Du(k)$$

$$x_c(0)=[0; 0; \ldots; 0], y_c(0)=[0; 0; \ldots; 0] \quad \text{Eq. 2}$$

$$x_o(k+1)=Ax_o(k)+K[y_c(k)-y_o(k)]+Bu(k)$$

$$y_o(k)=Cx_o(k)+Du(k) \quad \text{Eq. 3}$$

where $x_o(k) \in R^n$ is the vector of observer state, and $y_o(k) \in R^p$ is the vector of observer output. $K \in R^{n \times p}$ is a coefficient matrix that drives the state vector of observer to approximate the state vector of the original system. Other components are identical to what are specified in the original system.

When the initial condition of state vector $x_o(0)$ in the observer equals the initial condition of state vector $x_c(0)$ in the original system, the identity observer is an analytically redundant system of the original system. Otherwise, a properly designed K matrix can drive the error vector between the state vectors of observer and original system to zero.

EXAMPLE EMBODIMENT

An altitude-hold autopilot controller is presented in this section to illustrate an illustrative system architecture using an example K matrix, in accordance with my invention, in a controller-observer design for recovery. An example mathematical representation of an aircraft's dynamics along the pitch axis serves as the plant in this full-state feedback control system. The plant is a continuous system described in Eq. 4 by the state space equation and output equation in the s domain.

$$\dot{x}(t) = Ax(t) + Bu(t) \quad \text{Eq. 4}$$

$$y(t) = Cx(t)$$

$$x = \begin{bmatrix} u \\ w \\ q \\ \theta \\ h \end{bmatrix}$$

-continued $$A = \begin{bmatrix} -0.00642 & 0.0263 & 0.0 & -32.2 & 0.0 \\ -0.0941 & -0.624 & 820.0 & 0.0 & 0.0 \\ -0.000222 & -0.00153 & -0.668 & 0.0 & 0.0 \\ 0.0 & 0.0 & 1.0 & 0.0 & 0.0 \\ 0.0 & -1.0 & 0.0 & 830.0 & 0.0 \end{bmatrix}$$

$$B = \begin{bmatrix} 0.0 \\ -32.7 \\ -2.08 \\ 0.0 \\ 0.0 \end{bmatrix}$$

$$C = [1.0 \ 1.0 \ 1.0 \ 1.0 \ 1.0]$$

The plant is stabilized by a controller H in the first memory partition $MP_0$ with inputs $h_{ref}$ and $z_0(t)$, and output $p_0(t)$. The representation of the plant is depicted in Eq. 5.

$$H = \begin{bmatrix} 0.0009 \\ -0.0016 \\ 1.883 \\ 7.603 \\ -0.0018 \end{bmatrix} \quad \text{Eq. 5}$$

$$z_0 = \begin{bmatrix} u \\ w \\ q \\ \theta \\ \Delta h \end{bmatrix}$$

$$\Delta h = h_{ref} - h$$

$$p_0(t) = Hz_0(t)$$

Figure 17:
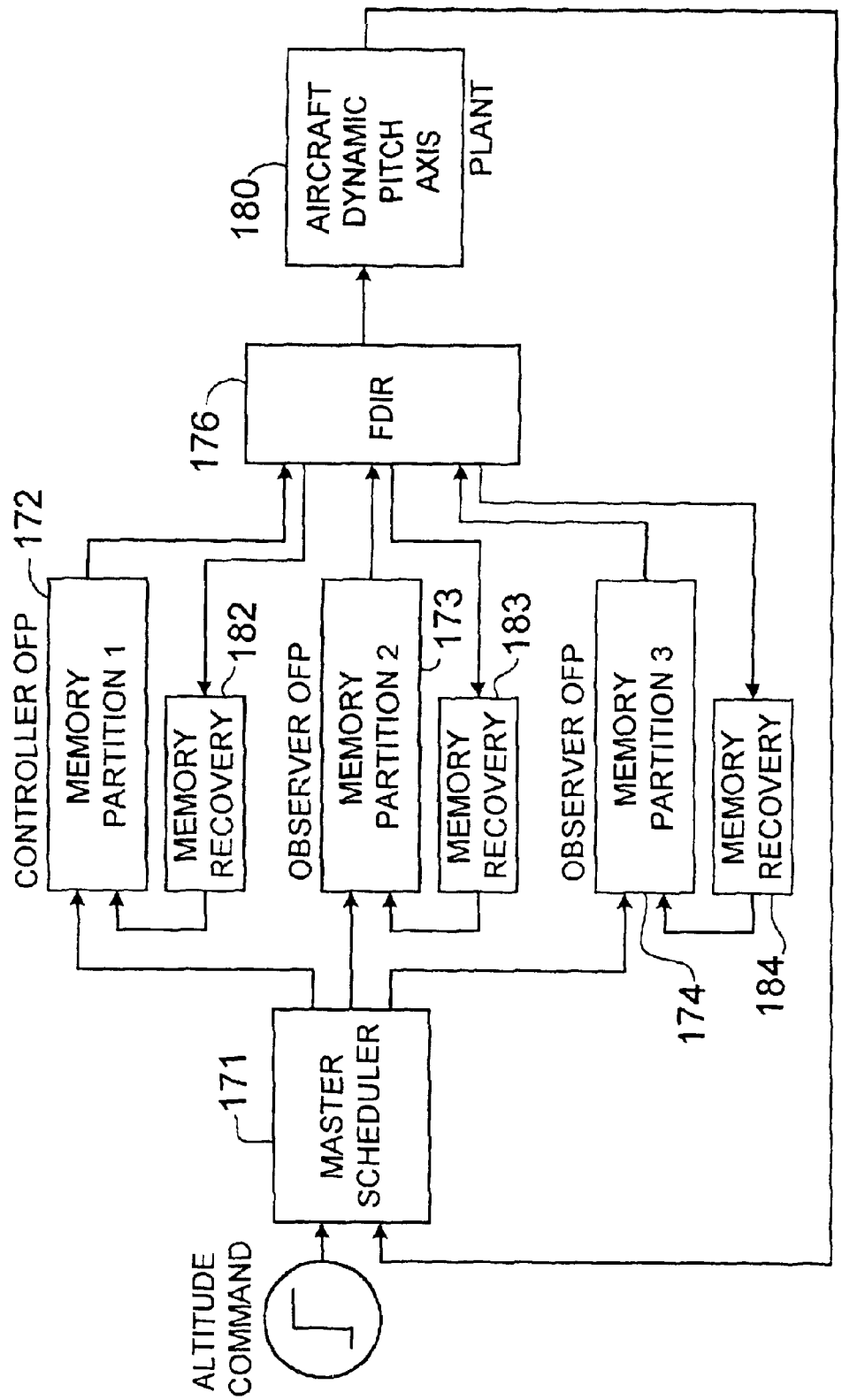
FIG. 17 depicts the system architecture of an example embodiment of my invention.

FIG. 17 depicts a block diagram of the control system implementing an illustrative embodiment of my invention. The block diagram consists of master scheduler 171, run-time controller 172, observers 173–174, FDIR module 176, and certain other function blocks. The aircraft plant 180, such as the aircraft dynamic pitch axis, is controlled by the consecutively connected controller 172 and observers 173–174. The mechanism of keeping the equality of initial conditions among the controller and observers resides in the master scheduler 171. In one embodiment, the first observer 173 and the second observer 174 use the same architecture and settings as the controller 172. In addition, a fault detection (FD) process using the pair-wise comparison generates the residual between outputs is added to the first observer in the second memory partition $MP_1$ as shown in Eq. 6.

$$z_1(0)=z_0(0)$$

$$p_1(t)=Hz_1(t)$$

$$e_{01}(t)=p_1(t)-p_0(t) \quad \text{Eq. 6}$$

The second observer in the third memory partition $MP_2$ is constructed in a similar way as the first observer. Eq. 7 depicts the representation of the second observer.

$$Z_2(0)=Z_1(0)$$

$$p_2(t)=Hz_2(t)$$

$$e_{12}(t)=p_2(t)-p_1(t) \quad \text{Eq. 7}$$

The fault mode of each partition $MP_{i,status}$ is evaluated by a fault isolation process, such as those known in the art.

When an anomaly is detected in one of the memory partitions, first the output priority Token$_{output}$ is evaluated for fault accommodation, and then the data image replication process MR is initiated to recover faulty memory partition. Since the controller holds the output priority, the token of output priority changes in case of a faulty controller. The token of output priority is assigned according to the fault mode of the memory partitions. The data image in the memory partition that obtains the token serves as the baseline to replace the data image in the faulty memory partition. The generalized process is mathematically described in Eq. 8.

$$Token_{output}(t) = \begin{cases} 0, & MP_{i,status}(t) = \text{Faulty\_Memory\_Partition}, \quad \forall\, i, i \in \{1, 2, 3\} \\ i, & MP_{i,status}(t) = \text{Healthy\_Memory\_Partition}, \quad \exists\, i, i \in \{1, 2, 3\} \end{cases} \quad \text{Eq. 8}$$

$$MR_{ij}(t)::\{MP_i(t) \to MP_j(t) | Token_{output}(t) = i \wedge MP_{j,status}(t) = \text{Faulty\_Memory\_Partition}, i, j \in \{1, 2, 3\}\}$$

Figure 2:
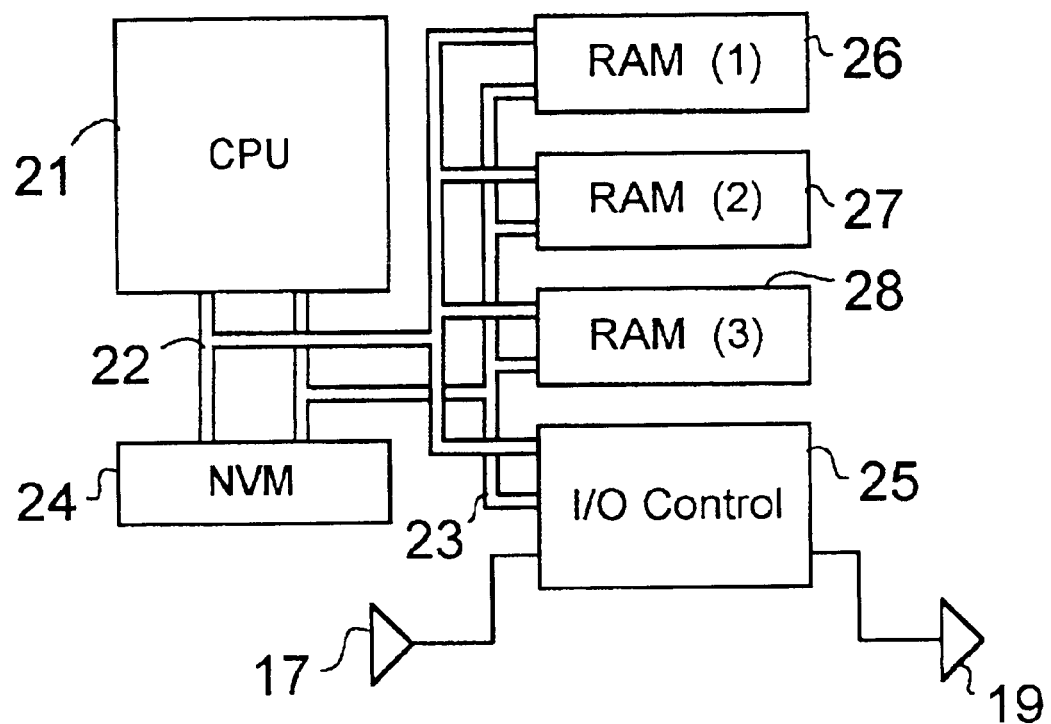
FIG. 2 depicts an internal block diagram of a typical flight critical computer including memory-mapped inputs and outputs.

Referring also to FIG. 2, the system RAM 26–28 is partitioned to accommodate the operations of the controller 172 and the observers 173–174. Sufficient memory is also allocated to FDIR functions. The size of the partition is equally allocated among the controller and the observers to enable the direct mapping of memory address between the any given two partitions. Each memory partition is operated by a dedicated memory-partition manager to configure the perspective memory partition. The memory managers keep the equality of the initial conditions in the controller 172 and observers 173–174. The master scheduler block is devised to activate the run-time controller and observers in a predefined timeframe while keeping the equality of initial conditions. The fault detection process proceeds in accordance with the readiness of outputs from controller 172 and observers 173–174. The final FDIR procedure is triggered before the output of control to the plant 180. In addition, the FDIR process commands the memory recovery managers 182–184 to initiate the memory recovery procedures in either a faulty controller or a faulty observer.

Figure 9:
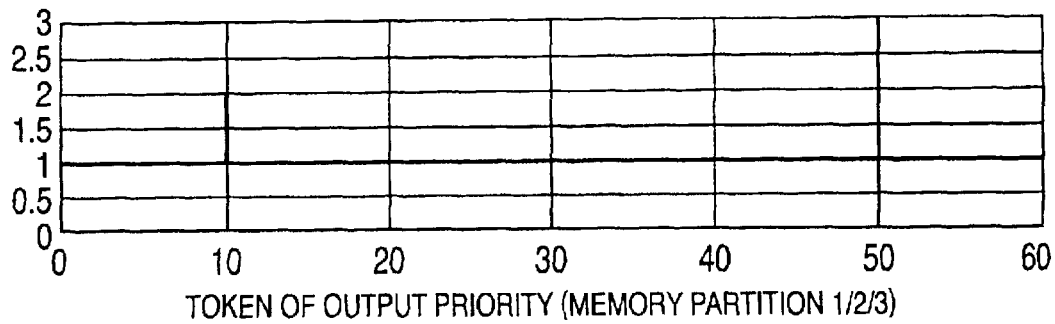
FIG. 9 depicts the token of output priority for an example embodiment of my invention.
Figure 10:
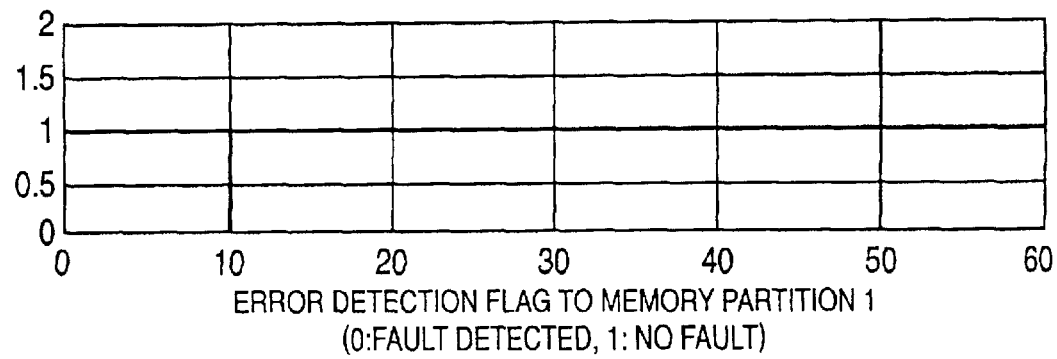
FIG. 10 depicts the error detection flag to memory partition 1 for an example embodiment of my invention.
Figure 11:
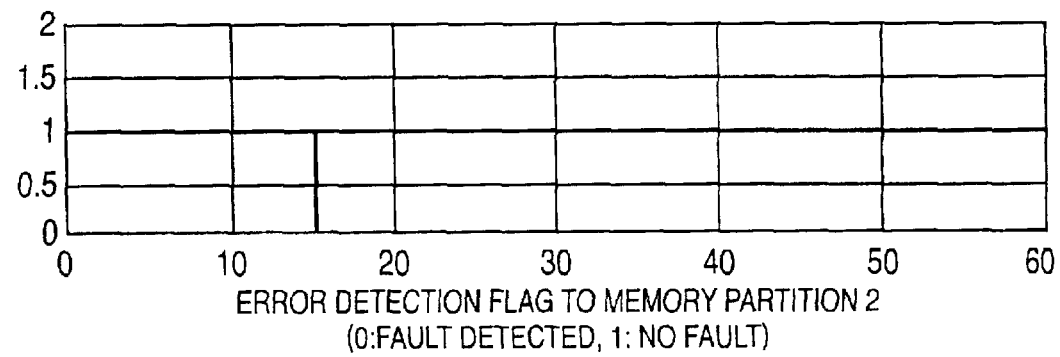
FIG. 11 depicts the error detection flag to memory partition 2 for an example embodiment of my invention.
Figure 12:
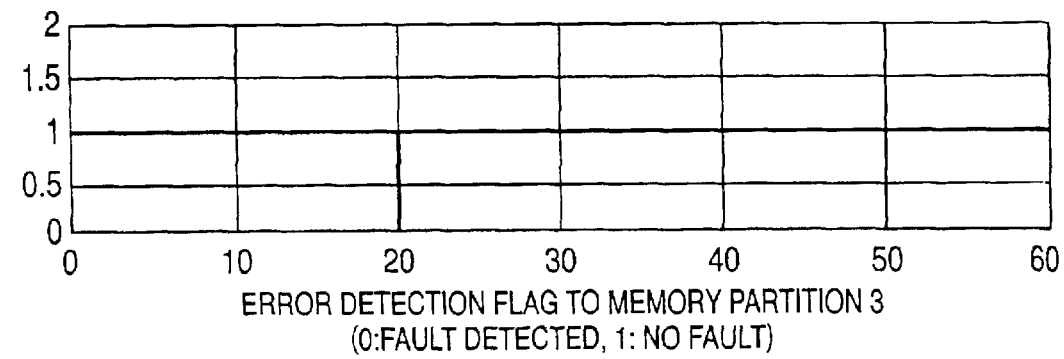
FIG. 12 depicts the error detection flag to memory partition 3 for an example embodiment of my invention.
Figure 13:
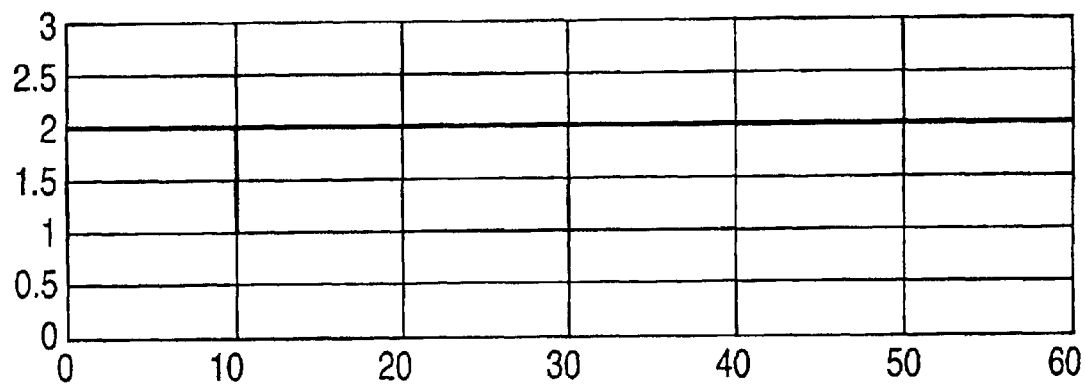
FIG. 13 depicts the memory recovery flag in memory partition 1 for an example embodiment of my invention.
Figure 14:
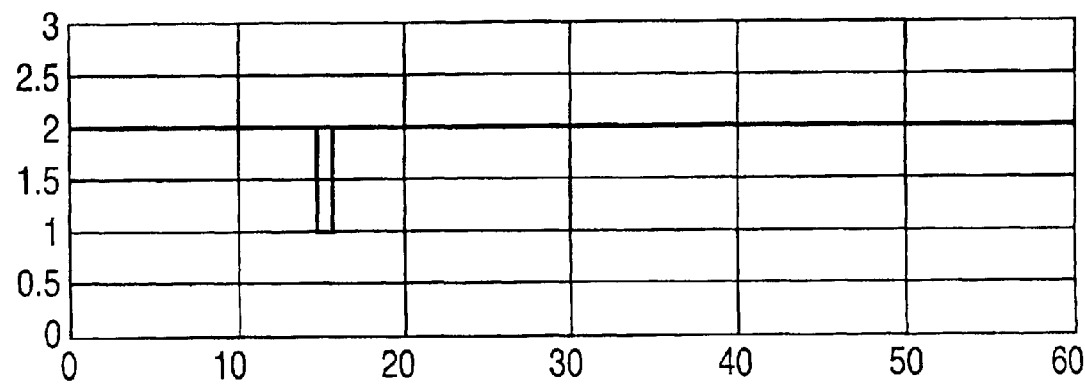
FIG. 14 depicts the memory recovery flag in memory partition 2 for an example embodiment of my invention.
Figure 15:
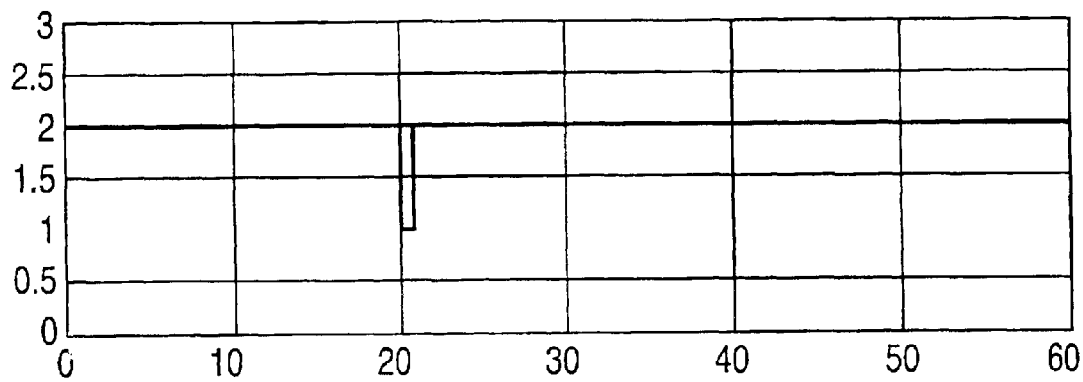
FIG. 15 depicts the memory recovery flag in memory partition 3 for an example embodiment of my invention.
Figure 16:
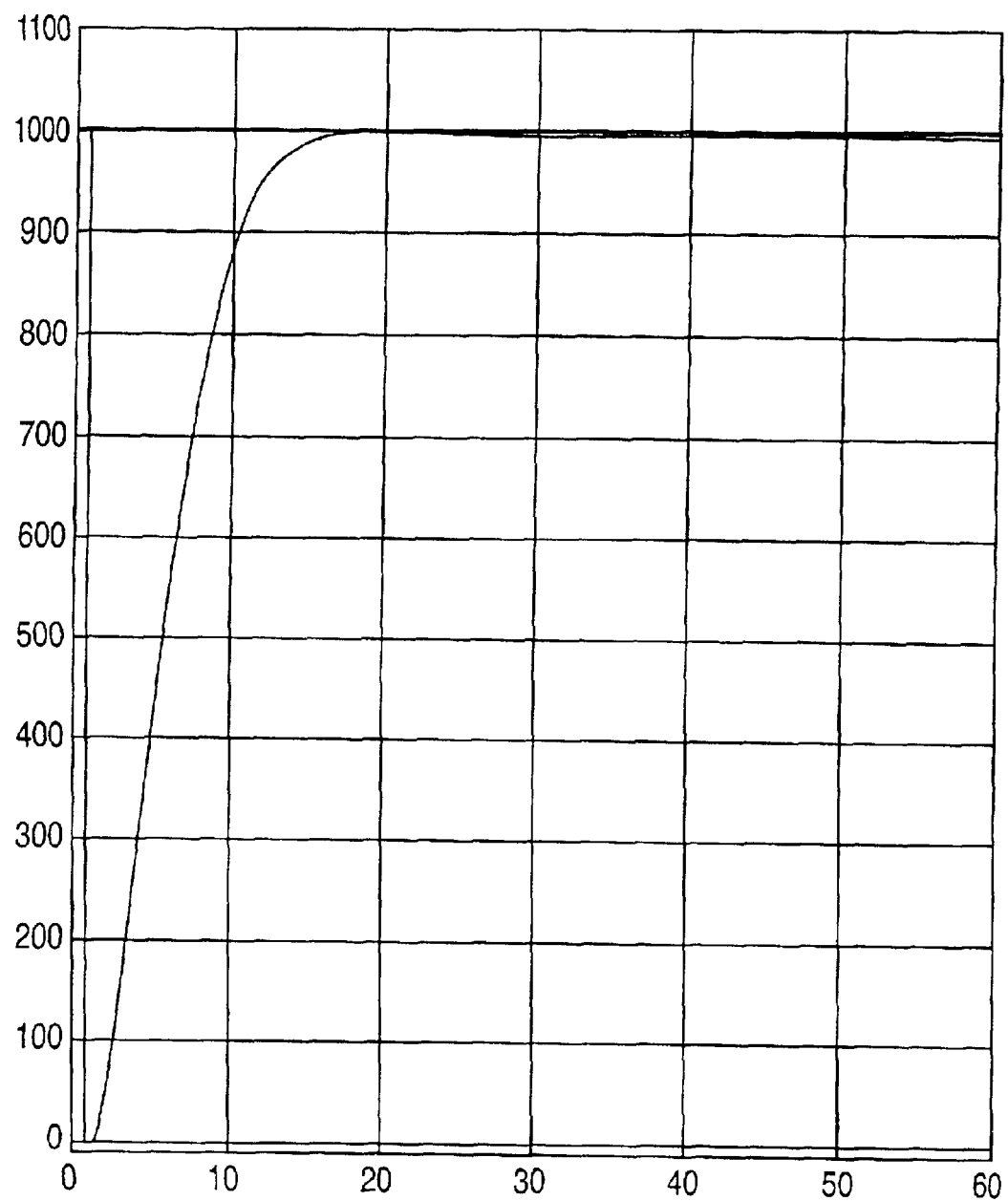
FIG. 16 depicts the time response of 'altitude' versus 'altitude reference' for an example embodiment of my invention.

Given the reference input as h$_{ref}$=1000.0, a 60-second nonreal-time simulation was conducted by using SIM-ULINK™ from Mathworks. Assuming that SEU occurs at a 5.0 seconds interval in a period of 15.0 seconds, data errors were injected to simulate these events. FIGS. 9–13 depicts the sequence of detected single event upset (SEU). As shown in FIG. 9, the SEU is detected at 10.0 seconds in the controller in the first memory partition. FIG. 10 shows that the SEU is detected at 15.0 seconds in the observer in the second memory partition, and FIG. 11 shows that the SEU is detected at 20.0 seconds in the observer in the third memory partition. FIGS. 14–15 depict the sequence and duration of triggered memory recovery efforts after each SEU being detected. FIG. 16 depicts the time response of the control system in such a scenario.

Advantageously, my invention provides a real-time recovery of a flight critical computer after a single event upset caused by radiation. As shown in the example embodiment, the performance of the controller is not degraded after the continual occurrence of SEU.

Alternate Embodiments

Alternate embodiments may be devised without departing from the spirit or the scope of the invention.

List of Acronyms Used in the Specification

The following is a list of the acronyms used in the specification in alphabetical order.

| | |
|---|---|
| CCA | circuit card assembly |
| CCDL | cross channel data link |
| CPU | central processing unit |
| FDIR | fault detection, identification and reconfiguration |
| I/O | input/output |
| ISM | input signal management |
| NVM | nonvolatile memory |
| OFP | operational flight program |
| OSM | output signal management |
| PID | proportional, integral, and derivative (controller) |
| RAM | random access memory |
| RMS | redundancy management system |
| RTOS | real-time operating system (software) |
| SEL | single event latch-up |
| SEU | single event upset |
| VMC | vehicle management computer |
| CPU | central processing unit |
| CPU | central processing unit |

What is claimed is:

1. A method for real-time self-recovery of a flight computer comprising the steps of:
   (a) partitioning program memory space into a plurality of memory partitions where each partition corresponds to a hardware device in the flight computer;
   (b) downloading a version of an operational flight program to each of said memory partitions, wherein one version of the operational flight program is designated as a controller and the remaining versions of the operational flight program are designated observers;
   (c) running the controller operational flight program;
   (d) sequentially running each of said observer operational flight programs;
   (e) determining whether the memory partition containing said controller operational program is damaged and, if such determination is made, assigning one of said observer operational flight programs as controller operational flight program;
   (f) overwriting the damaged partition with fault free data, said step of overwriting comprising,
      (i) determining whether more than one memory partition is damaged, and if such determination is made,
      (ii) setting a first flag that indicates that more than one memory partition is damaged and overwriting data in a damaged memory partition when said first flag is set,
   said method further comprising, if said flag indicating that more than one memory partition is damaged has been set,
   (g) downloading a version of the operational flight program to each of said memory partitions from a cross-channel data link;
   (h) performing a majority vote on data contained within each of said memory partitions;
   (i) marking as damaged, data within each memory partition that does not match a result of said majority vote; and
   (j) setting a second flag when data within more than one of said memory partitions is damaged.

2. A method of initializing and continuously operating during a fault recovery a computer that repeats a sequence of instructions according to a real-time schedule, said method comprising the steps of:
   (a) initializing said computer by downloading each of a plurality of operational programs into a corresponding each of a plurality of random access memory hardware modules;

(b) designating one of said plurality of operational programs as a controller operational program and designating the remaining of said plurality of operational programs as observer operational programs;

(c) running said controller operational program and each of said observer operational programs in sequential order on a common processor;

(d) comparing controller data stored within the memory hardware module containing the controller operational program with corresponding observer data stored within the each of the memory hardware modules containing the observer operational programs;

(e) detecting whether the controller data has been damaged and when such a detection has been made,
  (i) designating one of said observer operational programs as the new controller operational program,
  (ii) overwriting data stored within the memory hardware module where the damaged data has been detected, and which previously contained an operational program designated as the controller operational program, with fault-free data from another memory hardware module,
  (iii) redesignating the operational program within the memory hardware module where the damaged data has been detected as a new observer operational program; and (f) repeating said steps of running operational programs, comparing data, and detecting whether data has been damaged, within one iteration of said real-time schedule, in order to continuously operate said computer.

3. The method according to claim 2, wherein the step of running the controller operational program and each of said observer operational programs in sequential order further includes each operational program run being initiated by a dedicated hardware timer.

4. The method according to claim 2, wherein the step of comparing controller data stored within the memory hardware module containing the controller operational program with corresponding observer data stored within the each of the memory hardware modules containing the observer operational programs further comprises:

(a) performing a majority vote on data contained within each of said memory hardware modules;
  (b) marking data within each memory hardware module that does not match a result of said majority vote; and
  (c) setting a flag when data within the memory hardware module containing said controller operational program is damaged.

5. The method according to claim 2, wherein the step of overwriting data stored within the memory hardware module where the damaged data has been detected with fault-free data further comprises:

(a) determining whether more than one of said memory hardware modules contains damaged data, and if such determination is made,
    (i) setting a flag that indicates that more than one memory hardware module contains damaged data; and
  (b) overwriting data in a memory hardware module containing damaged data when said flag is not set.

6. The method according to claim 2, wherein the controller data is damaged by a radiation event.

7. The method according to claim 2, wherein the step of initializing said computer by downloading each of a plurality of operational programs further includes downloading said plurality of operational programs from nonvolatile memory.

* * * * *